(12) United States Patent
Furuya

(10) Patent No.: US 7,742,192 B2
(45) Date of Patent: Jun. 22, 2010

(54) IMAGE PROCESSING METHOD AND SYSTEM

(75) Inventor: Tomoyuki Furuya, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1077 days.

(21) Appl. No.: 11/432,810

(22) Filed: May 11, 2006

(65) Prior Publication Data

US 2006/0256356 A1 Nov. 16, 2006

(30) Foreign Application Priority Data

May 12, 2005 (JP) ............................. 2005-140005

(51) Int. Cl.
*G06F 15/00* (2006.01)
*G06K 15/00* (2006.01)
*G06K 9/34* (2006.01)
*H04N 1/46* (2006.01)
*H04N 1/387* (2006.01)
*G09G 5/00* (2006.01)

(52) U.S. Cl. ................. 358/1.9; 358/2.1; 358/1.18; 358/540; 358/450; 382/176; 382/180; 345/629; 345/630; 345/634; 345/636; 345/637

(58) Field of Classification Search ................. 358/1.9, 358/1.15, 2.1, 1.18, 540; 382/180; 345/629
See application file for complete search history.

(56) References Cited

U.S. PATENT DOCUMENTS 5,767,978 A * 6/1998 Revankar et al. ............ 358/296
2002/0191202 A1 * 12/2002 Furuya ........................ 358/1.9

FOREIGN PATENT DOCUMENTS

JP 2001-228990 8/2001

* cited by examiner

*Primary Examiner*—King Y Poon
*Assistant Examiner*—Vincent R Peren
(74) *Attorney, Agent, or Firm*—Cowan, Liebowitz & Latman, P.C.

(57) ABSTRACT

In bitmapping an input rendering command to a bitmap, a logic operation designated by the rendering command is analyzed in accordance with the source and pattern as the logic operation target and a logic operation code. On the basis of the analysis result, an additional information operation corresponding to each pixel of the bitmap is created. On the basis of the additional information operation, additional information of each pixel is created. When image processing based on the additional information is executed for the bitmap, high-quality output image data can be created.

2 Claims, 17 Drawing Sheets

FIG. 5
Op1 : ADDITIONAL INFORMATION
      STORAGE
Op2 : CLEAR
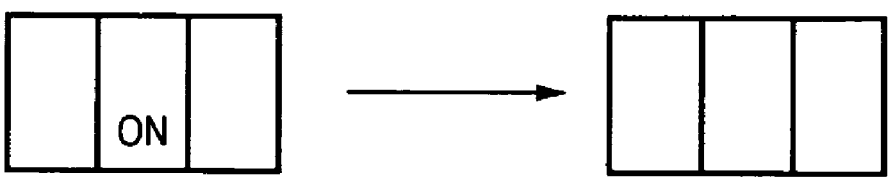
Op3 : NO OPERATION
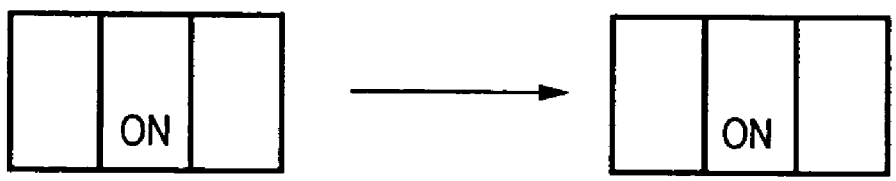
Op4 : INVERSION (NO OPERATION)
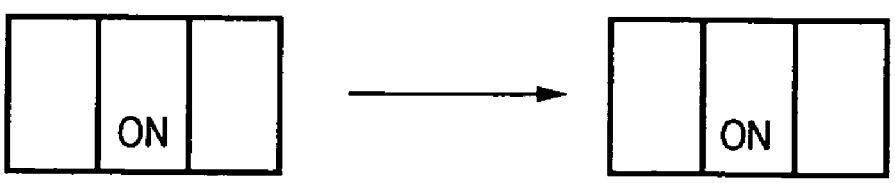

FIG. 6

| PATTERN | SOURCE | DESTINATION | RESULT | SOURCE COPY | PATTERN COPY |
|---------|--------|-------------|--------|-------------|--------------|
| 0 | 0 | 0 | r000( 0 or 1 ) | 0 | 0 |
| 0 | 0 | 1 | r001( 0 or 1 ) | 0 | 0 |
| 0 | 1 | 0 | r010( 0 or 1 ) | 1 | 0 |
| 0 | 1 | 1 | r011( 0 or 1 ) | 1 | 0 |
| 1 | 0 | 0 | r100( 0 or 1 ) | 0 | 1 |
| 1 | 0 | 1 | r101( 0 or 1 ) | 0 | 1 |
| 1 | 1 | 0 | r110( 0 or 1 ) | 1 | 1 |
| 1 | 1 | 1 | r111( 0 or 1 ) | 1 | 1 |

| SOURCE | DESTINATION | RESULT |
|--------|-------------|--------|
| 0 | 0 | r000 |
| 0 | 1 | r001 |
| 1 | 0 | r010 |
| 1 | 1 | r011 |

| SOURCE | RESULT | OPERATION OF TARGET ATTRIBUTE BIT |
|--------|--------|-----------------------------------|
| 0 | r000 | Target_SrcON |
| 0 | r001 | |
| 1 | r010 | Target_SrcOFF |
| 1 | r011 | |

| SOURCE | RESULT | OPERATION OF TARGET ATTRIBUTE BIT | OPERATION OF NON-TARGET ATTRIBUTE BIT |
|---|---|---|---|
| 0 | r000 | Target_SrcON | → NonTarget_SrcON |
| 0 | r001 | | |
| 1 | r010 | Target_SrcOFF | → NonTarget_SrcOFF |
| 1 | r011 | | |

*(PRIOR ART)*

*(PRIOR ART)*

*(PRIOR ART)*

IMAGE PROCESSING METHOD AND SYSTEM

FIELD OF THE INVENTION

The present invention relates to an image processing method and system and, more particularly, to an image processing method and system for creating attribute information of each pixel.

BACKGROUND OF THE INVENTION

An image processing apparatus for providing a high-quality print image generally executes the following processing. First, a 24-bit RGB multilevel bitmap is rendered on a multilevel bitmap area in accordance with a rendering command. When processing of all rendering commands is ended, color processing (color correction, color conversion, $2^n$-ary conversion) is executed for the entire multilevel bitmap area. FIG. 12 shows this processing. As shown in FIG. 12, rendering objects with attributes such as "text", "graphics", and "image" are rendered on the multilevel bitmap area. The same color processing is executed for the entire multilevel bitmap area independently of the attributes, thereby obtaining a bitmap dependent on a device such as a printer to output the image. That is, different color processing operations cannot be executed for the rendered objects.

As described above, a rendered multilevel bitmap has no additional information representing the attribute of each pixel. Since the type (text, graphics, or image) of rendered object to which an arbitrary pixel belongs or whether the pixel belongs to the edge portion or central portion of the object cannot be determined, optimum color processing cannot be executed for each pixel.

Various kinds of methods of optimally changing color processing for each pixel have been proposed presently. As a general method, additional information is added to all pixels.

For example, one byte is ensured for every 24-bit RGB data, and processing is executed by RGBα 32 bits per pixel. Alternatively, as shown in FIG. 13, an additional information memory is ensured in another area, and additional information is set for all pixels. In the method shown in FIG. 13, every time a pixel in the multilevel bitmap area is updated, additional information corresponding to the pixel is also updated. After all rendering commands are rendered on the multilevel bitmap area, a bitmap is generated by executing color processing optimum for each attribute by referring to the additional information of each pixel (e.g., Japanese Patent Laid-Open No. 2001-228990).

In the conventional color processing scheme for each pixel, no problem arises as long as all rendering objects are overwritten. However, when a rendering object for which a logic operation is designated is processed, the additional information cannot be stored correctly. A detailed example will be described below with reference to FIG. 14.

Referring to FIG. 14, rendering object 1 having image attribute and rendering object having graphics attribute are processed. A logic operation "render only when no background is present" is designated for rendering object 2. In this case, additional information 1 corresponding to rendering object 1 is stored in an additional information storage area 141. Then, additional information 2 corresponding to rendering object 2 is stored in the additional information storage area 141. At this time, additional information 2 is overwritten on already stored additional information 1 in some pixels.

Ideally, when the logic operation designated for rendering object 2 is executed, rendering object 1 should wholly be rendered as a color-processed bitmap 142 while rendering object 2 overlapping it should not be rendered. However, as indicated by the additional information storage area 141 in FIG. 14, when additional information is stored without considering the logic operation, some pixels are determined as not "image" but "graphics". Hence, no optimum color processing can be executed, and no optimum rendering is executed, either.

SUMMARY OF THE INVENTION

In view of the above problems in the conventional art, the present invention has an object to provide an image processing method and system for creating appropriate additional information for each pixel in bitmapping multilevel image data.

In one aspect of the present invention, an image processing method comprises a bitmapping step of bitmapping an input rendering command to a bitmap, an analysis step of analyzing a logic operation designated by the rendering command, an additional information creation step of creating additional information representing an attribute of each pixel of the bitmap on the basis of the analysis result, and an output data creation step of creating output image data by executing, for the bitmap, image processing based on the additional information.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a view showing the types of additional information storage operations according to the embodiment;

FIG. 6 is a view showing a general logic operation;

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

Figure 1:
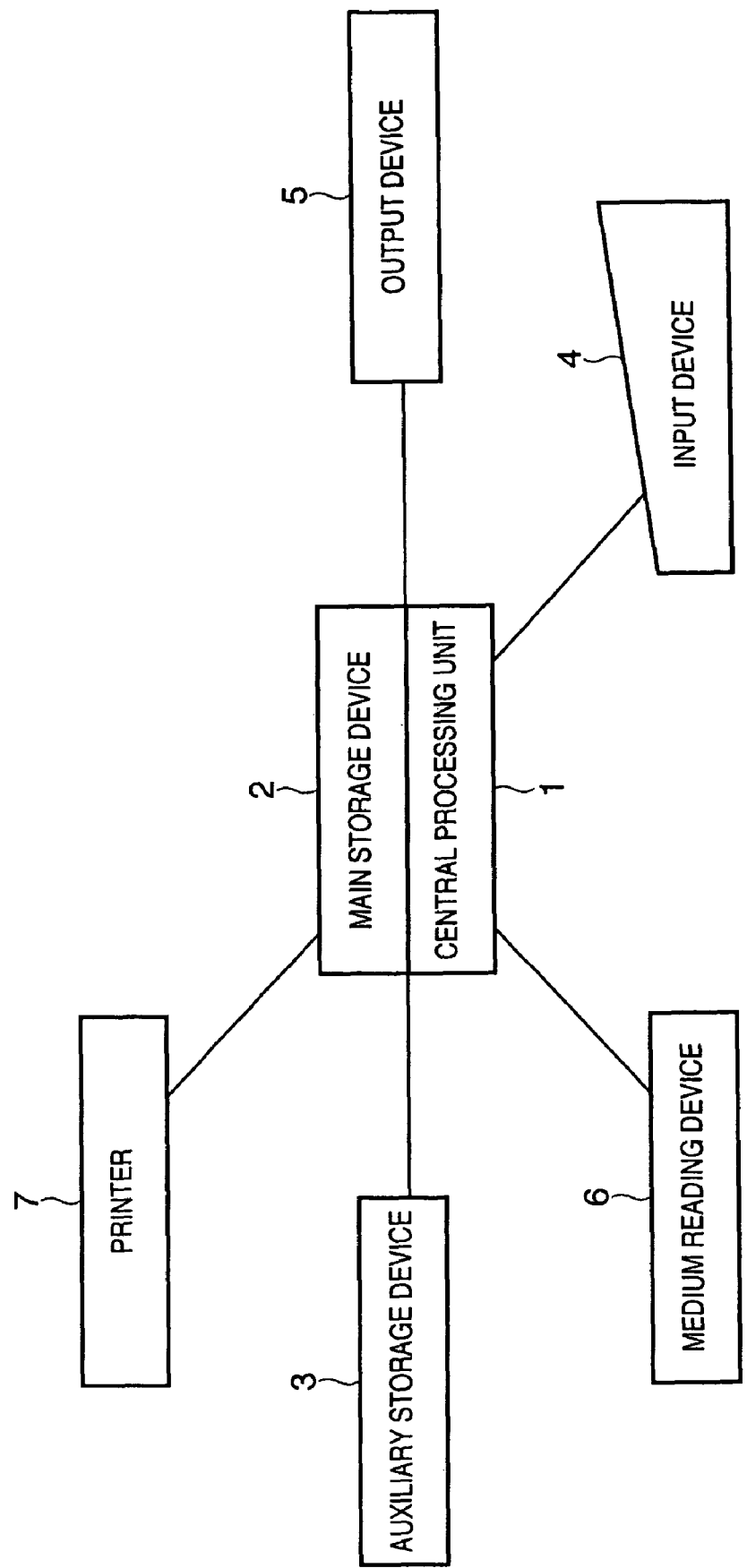
FIG. 1 is a block diagram showing a configuration example of an information processing system which implements an image processing method according to an embodiment of the present invention.
Figure 2:
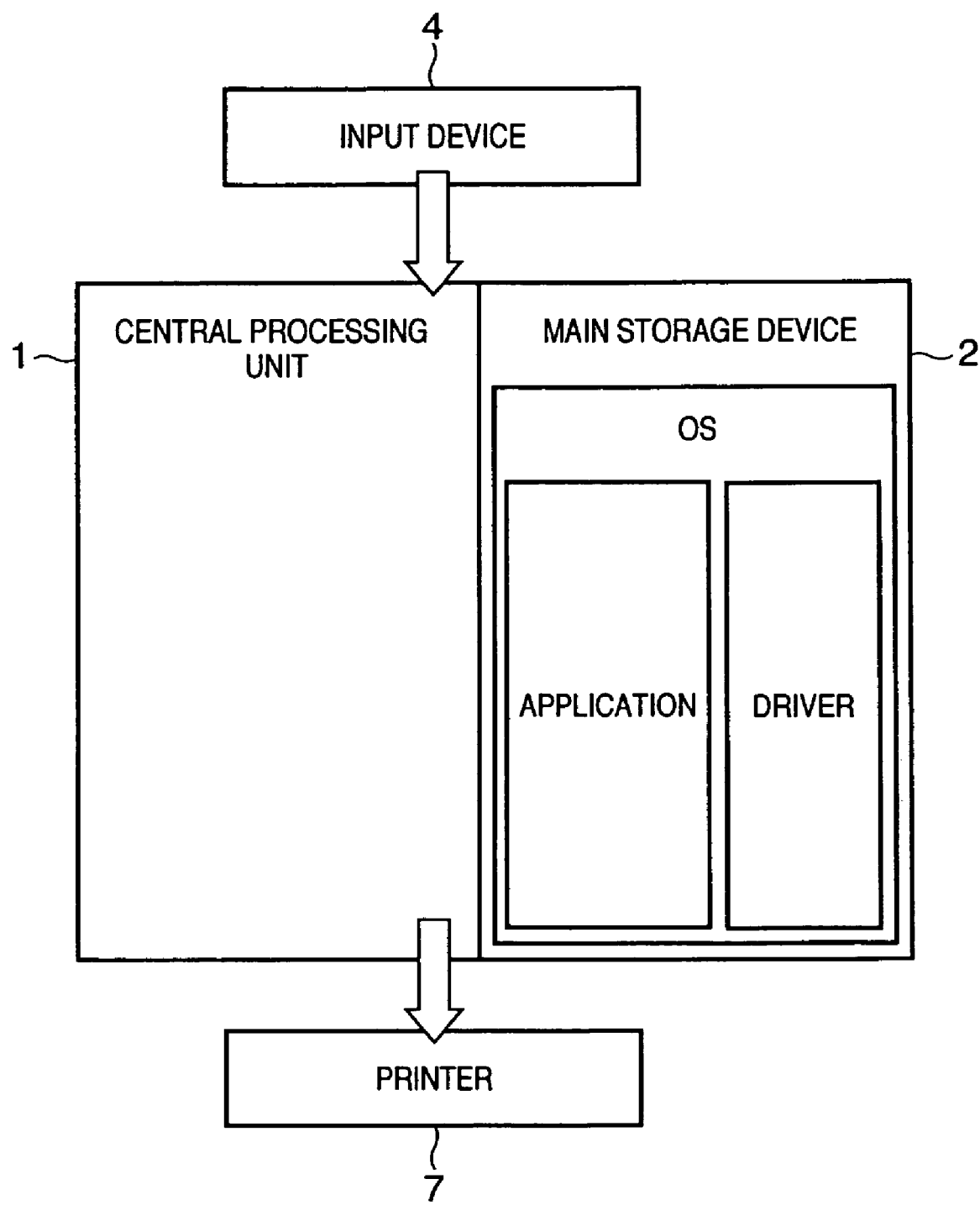
FIG. 2 is a view showing the flow of data in the information processing system according to the embodiment.
Figure 3:
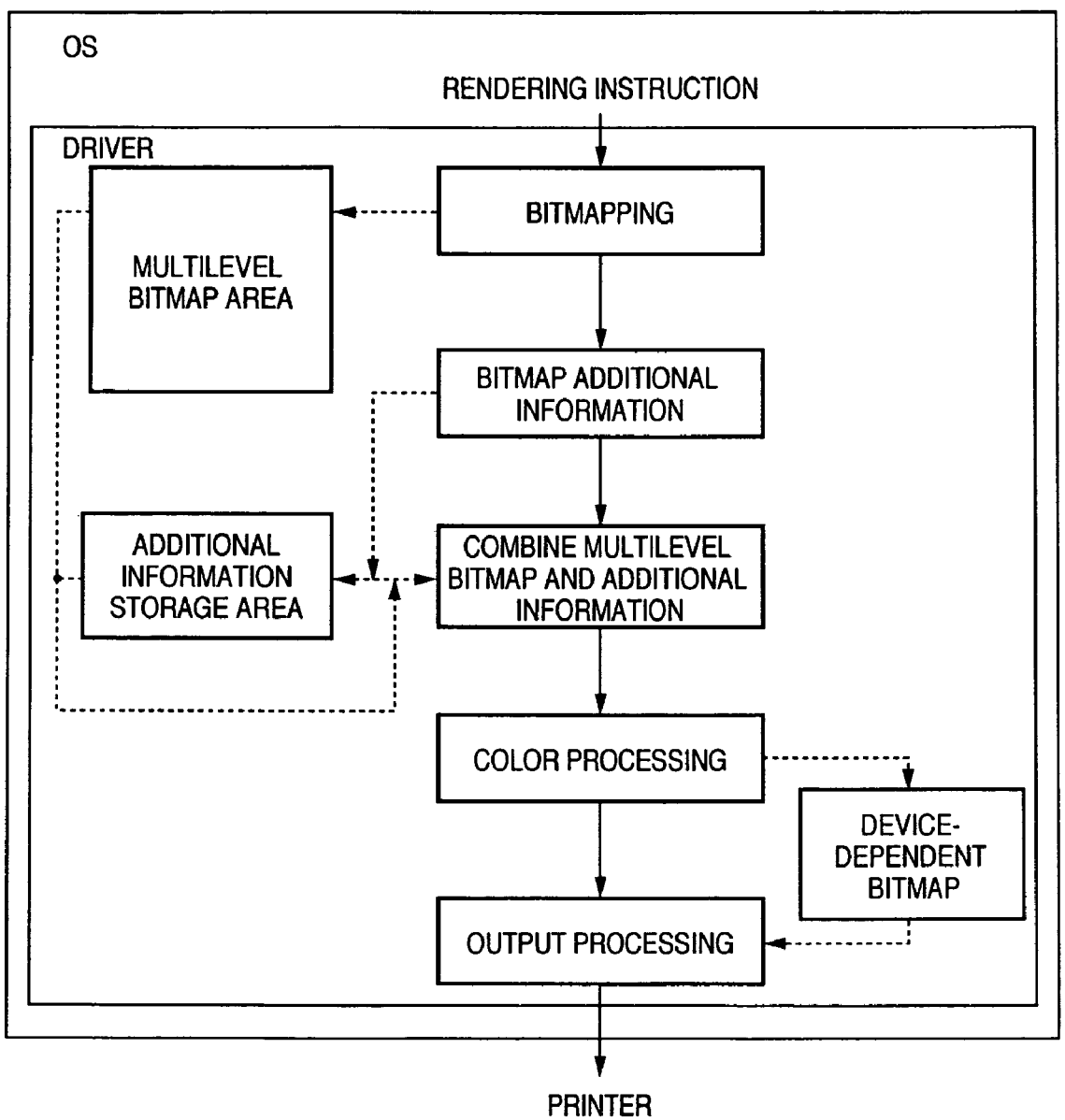
FIG. 3 is a block diagram showing the outline of processing of a printer driver according to the embodiment.

FIGS. 1 to 3 are block diagrams showing a configuration example of an information processing system which implements an image processing method according to this embodiment.

Referring to FIG. 1, a central processing unit 1 processes information input from an input device 4 in accordance with a system program or application program loaded from an auxiliary storage device 3 to a main storage device 2 and outputs the information to an output device 5 or printer 7. A control program and related data of this embodiment are read out from a storage medium such as an FD, CD-ROM, or IC memory card by a medium reading device 6 and stored in the auxiliary storage device 3.

In this embodiment, the output device 5 comprises a display device such as a display and is therefore distinguished from the printer 7. The input device 4 comprises a keyboard or pointing device. The auxiliary storage device 3 comprises a hard disk or magnetooptical disk or a combination thereof. A configuration that connects the devices through a network is also incorporated in the present invention.

FIG. 2 is a view showing the flow of data when the control program and related data stored in the auxiliary storage device 3 are read by the central processing unit 1 and expanded in the main storage device 2, a print instruction is input from the input device 4, and data is sent to the printer 7 and printed. Both the application and the driver on the main storage device 2 function under the control of the OS. The central processing unit 1 and main storage device 2 are implemented as a host computer. The driver here indicates a printer driver.

FIG. 3 is a block diagram showing details of processing of the driver shown in FIG. 2. Referring to FIG. 3, upon receiving a rendering command from the OS, the driver bitmaps the rendering command on a multilevel bitmap and simultaneously stores, in the additional information storage area, the attribute of the additional information of a rendering object.

The attribute of additional information here indicates information necessary for optimum color processing, including an object type (image, graphics, or text) and edge information representing an edge of an object.

In this embodiment, the multilevel bitmap area and additional information storage area are separate. However, the present invention can also be implemented by employing, e.g., a bitmap (RGBα 32-bit) that connects a 24-bit RGB multilevel bitmap and 8-bit additional information α. In this embodiment, bitmapping a rendering command in the multilevel bitmap and storing additional information can be executed as independent processing.

When all rendering commands are processed, multilevel bitmap data is extracted in correspondence with each of various kinds of additional information by combining the additional information and the multilevel bitmap. Color processing corresponding to each additional information is executed for the extracted bitmap data, thereby creating a device-dependent bitmap. This processing is repeatedly executed for all pieces of additional information to create a combined device-dependent bitmap. The device-dependent bitmap is output to the printer 7.

In this embodiment, the present invention is executed on the printer driver. However, the present invention can also be implemented even when the processing is performed in the printer 7.

Processing according to this embodiment on the information processing system shown in FIGS. 1 to 3 will be described below in detail with reference to FIGS. 4 to 9.

Figure 4:
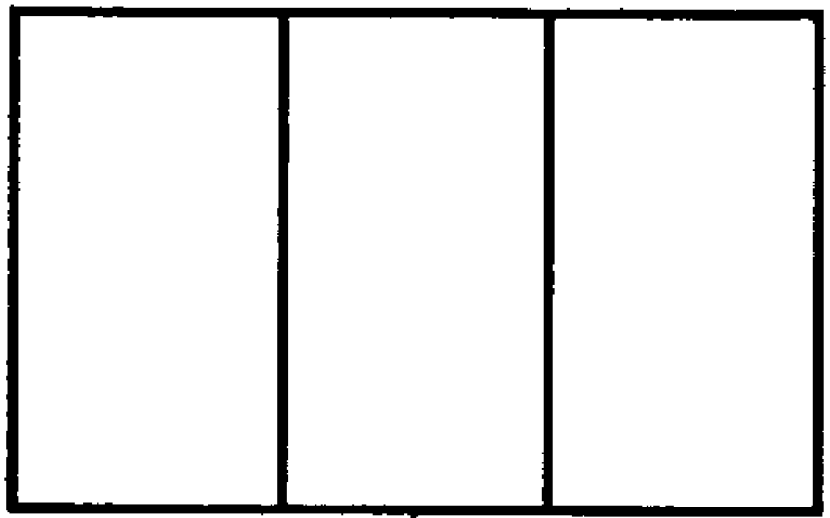
FIG. 4 is a view showing an example of an additional information storage format according to the embodiment.

FIG. 4 is a view showing the format of an additional information storage area for one pixel of a multilevel bitmap. If additional information represents an object type (three types: image, graphics, and text), three bits are necessary to represent each attribute by a bit. In this embodiment, image, graphics, and text attributes are represented sequentially from the top of the three bits. The additional information storage area is not limited to three bits per pixel and may be represented by eight bits (for example, five remaining bits are not used) including reserve bits.

FIG. 5 is a view showing a detailed example of additional information storage in the additional information storage area when a logic operation designation is done for the rendering object shown in FIG. 4. A case will be described here wherein only the graphics attribute is already set as background information before the bit of the image attribute is set as additional information. In this case, the logic operation in storing the additional information in the additional information storage area can be classified into four kinds of operations (OP) to be described below. In the three bits representing additional information shown in FIG. 5, "ON" indicates that the bit is set, and a blank indicates that the bit is not set (the bit is cleared).

Op1: additional information storage (the bit of a target attribute is set)

Op2: clear (the bits of the additional information storage area are cleared)

Op3: no operation (the bits of the additional information storage area are kept unchanged)

Op4: inversion (the bits of the additional information storage area can remain unchanged)

"Op4: inversion" designates only inversion of a color with a given attribute. Hence, the bits of the additional information storage area can remain unchanged, like "Op3: no operation".

FIG. 5 shows examples of the above-described four kinds of operations when the additional information of the background indicates the graphics attribute, and the additional information of the image attribute should be stored in this state. In this case, in Op1, the additional information of the image attribute is overwritten, and the graphics attribute of the background is lost.

An example will be described below with reference to FIGS. 6 to 8 wherein in processing a rendering object with a designation of a predetermined logic operation, the four kinds of operations shown in FIG. 5 are selectively done in additional information storage processing.

FIG. 6 is a view showing a general logic operation for the descriptive convenience of this embodiment. A logic operation here indicates operation contents in storing an operation result by a "pattern" bit for a "source" bit in a destination bit in the additional information storage area. The result of the "operation", i.e., bits (rxxx) to be finally stored in the additional information storage area can arbitrarily be 0 or 1 in all combinations of "pattern", "source", and "destination". The xxx portion of rxxx, i.e., the bits of the "result", are expressed by sequentially arranging the pattern, source, and destination bit values. A total of $2^4$ (=16) kinds of logic operations can exist. A logic operation code uniquely defines a logic operation.

FIG. 6 shows "source copy" and "pattern copy" as an example of a general logic operation. "Source copy" represents overwrite of "source" on "destination" and indicates that the bit represented by "source" directly becomes "result" independently of the combination of "pattern" and "destination". Similarly, "pattern copy" represents overwrite of "pattern" on "destination" and indicates that the bit represented by "pattern" directly becomes "result".

FIGS. 7A to 7D are views showing a state wherein an additional information operation is actually changed on the basis of a logic operation designated for a rendering object in this embodiment. Generally, a logic operation is designated by a logic operation code, as described above. In this embodiment, any logic operation code capable of uniquely determining "result" in FIG. 6 can be used. In this example, the logic operation code is assumed to be given in Microsoft Windows®. In this case, 0 represents bit ON, and 1 represents bit OFF.

Figure 7A:
FIG. 7A is a view for comparing logic operation of the embodiment with the general logic operation.
Figure 7B:
FIG. 7B is a view showing a method of determining an operation for a target attribute bit.

FIGS. 7A and 7B show an operation for the bit of an attribute (the attribute which must be set if no logic operation is designated: to be referred to as a target attribute hereinafter) as a target in additional information. FIG. 7A shows noticeable values in. FIG. 6 to facilitate comparison with a general logic operation.

If "pattern" associated with a rendering object is white, i.e., bit OFF, r1xx shown as "result" in FIG. 6 are bits to be used to create an additional information operation. If "pattern" is not white, i.e., bit ON, r0xx are bits to be used. FIG. 7A shows an example wherein the pattern associated with the rendering object is not white. "White" is regarded as a special color because it (0xFFFFFFFF in RGB values) indicates a color and also nonexistence in a logic operation.

Next, a combination of rx00 and rx01 when "source" is 0 and a combination of rx10 and rx11 when "source" is 1 are checked. The combinations (rx00,rx01) and (rx10,rx11) take one of values (0,0), (0,1), (1,0), and (1,1). These values are assigned to the four kinds of operations (Op1 to Op4) shown in FIG. 5 in the following way.

(0,0)→bit ON, i.e., Op1: additional information storage
(1,1) bit OFF, i.e., Op2: clear
(0,1)→bit is the same as destination, i.e., Op3: no operation
(1,0)→bit is reverse to destination, i.e., Op4: inversion (i.e., like Op3: no operation)

One of the operations is uniquely determined for the cases of "source" 0 and "source" 1. FIG. 7B shows this situation. Referring to FIG. 7B, each of Target_SrcON representing the operation for the target attribute bit when "source" is 0 and Target_SrcOFF representing the operation for the target attribute bit when "source" is 1 indicates one of Op1 to Op4.

Figures 7C, 7D:
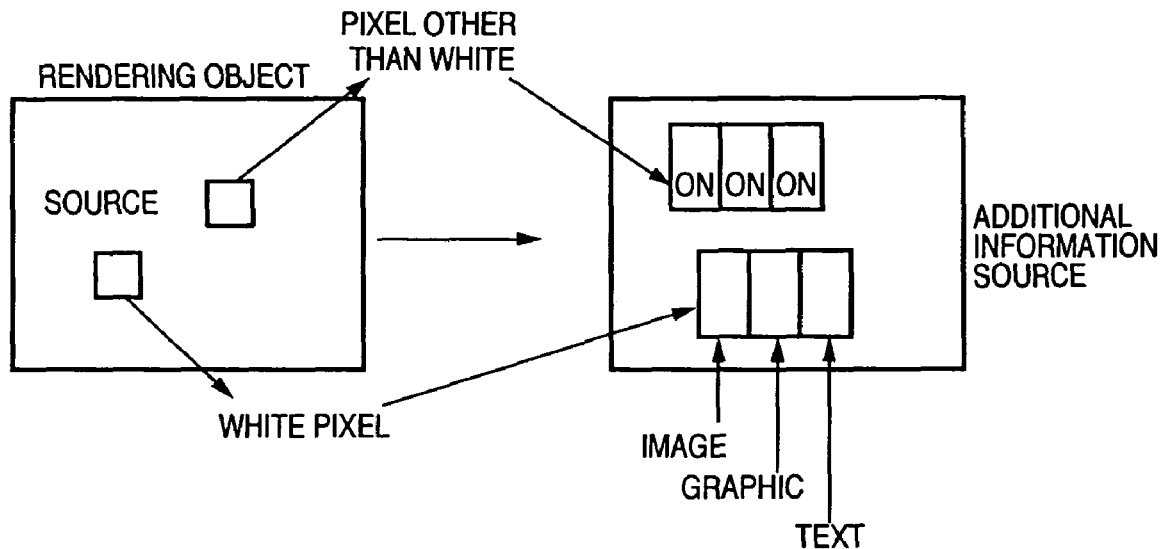
FIG. 7C is a view showing an additional information source creation method.
FIG. 7D is a view showing a method of determining an operation for a non-target attribute bit.

In this case, the source for the rendering object must be changed to an additional information source. More specifically, as shown in FIG. 7C, if a certain pixel in the source is "white", all the attributes of the additional information source must be set to OFF (1 in Windows). If a pixel is not "white", all the attributes must be set to ON (0 in Windows).

The operation determined in the above-described way is one for the target attribute bit of additional information. An operation for each attribute (to be referred to as a non-target attribute hereinafter) except the target attribute of additional information is uniquely determined in accordance with the operation of the target attribute determined as shown in FIG. 7B.

Target attribute is set to Op1: additional information storage→non-target attribute bit is set to Op2: clear
Target attribute is set to Op2: clear→non-target attribute bit is also set to Op2: clear
Target attribute is set to Op3: no operation→non-target attribute bit is also set to Op3: non-operation
Target attribute is set to Op4: inversion→non-target attribute bit is also set to Op4: inversion FIG. 7D shows this situation. Referring to FIG. 7D, each of NonTarget_SrcON representing the operation for a non-target attribute bit when "source" is 0 and NonTarget_SrcOFF representing the operation for a non-target attribute bit when "source" is 1 indicates one of Op2 to Op4. That is, Op1: additional information storage is not present as an operation for a non-target attribute.

In this embodiment, in processing a rendering object with a logic operation designation, an operation determined in the above-described way is executed for each attribute of additional information, thereby creating appropriate additional information.

A method of efficiently processing an operation for additional information will be described with reference to FIGS. 8A to 8C. In this embodiment, the operation must be switched for each additional information of pixels in accordance with the attribute bit or additional information source. To efficiently execute this processing, the operations can be represented by using "pattern" and "source" of additional information, as shown in FIG. 6. To do this, an additional information pattern must be prepared.

Figure 8A:
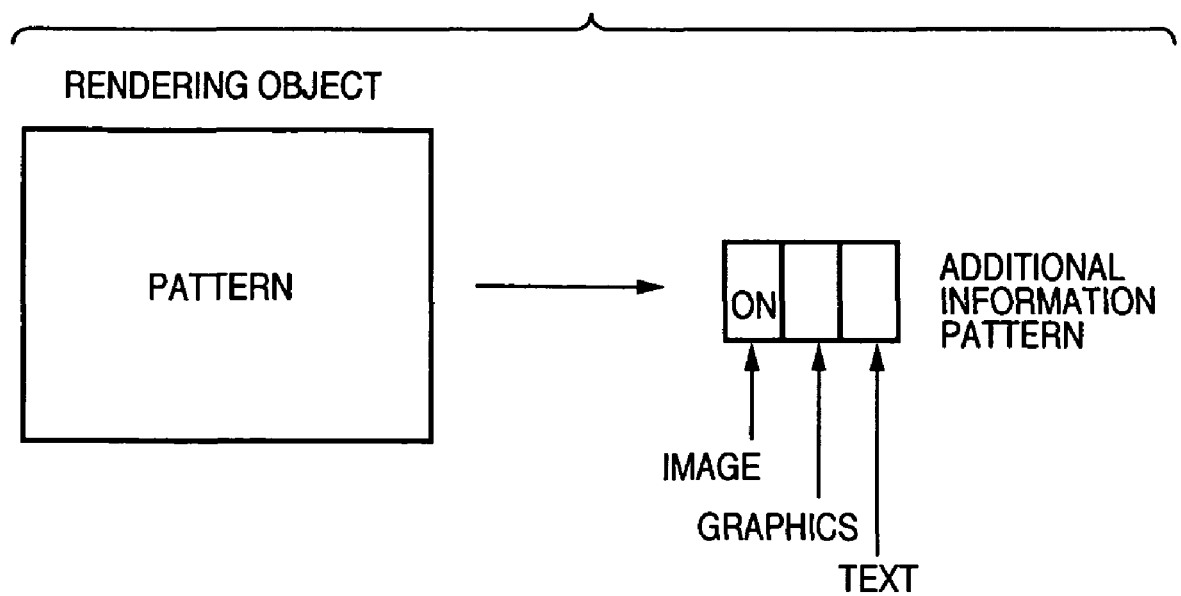
FIG. 8A is a view showing an additional information pattern creation method according to the embodiment.

In the additional information pattern, a bit representing the attribute (image attribute in this example) of a rendering object is set to ON, and the remaining bits are set to OFF, as shown in FIG. 8A. FIG. 8B shows the operations shown in FIG. 7D in the form shown in FIG. 6 by using the additional information source shown in FIG. 7C and the additional information pattern shown in FIG. 8A. Referring to FIG. 8B, the part corresponding to "0 or 1" of "result" in FIG. 6, i.e., "OFF or ON" as an operation result is uniquely determined by the operations of the target attribute and non-target attribute described in FIGS. 7B and 7D.

The operation determining method will be described below in detail with reference to FIG. 8C. FIG. 8C is a view showing a storage example of additional information for all operations.

Figure 8B:
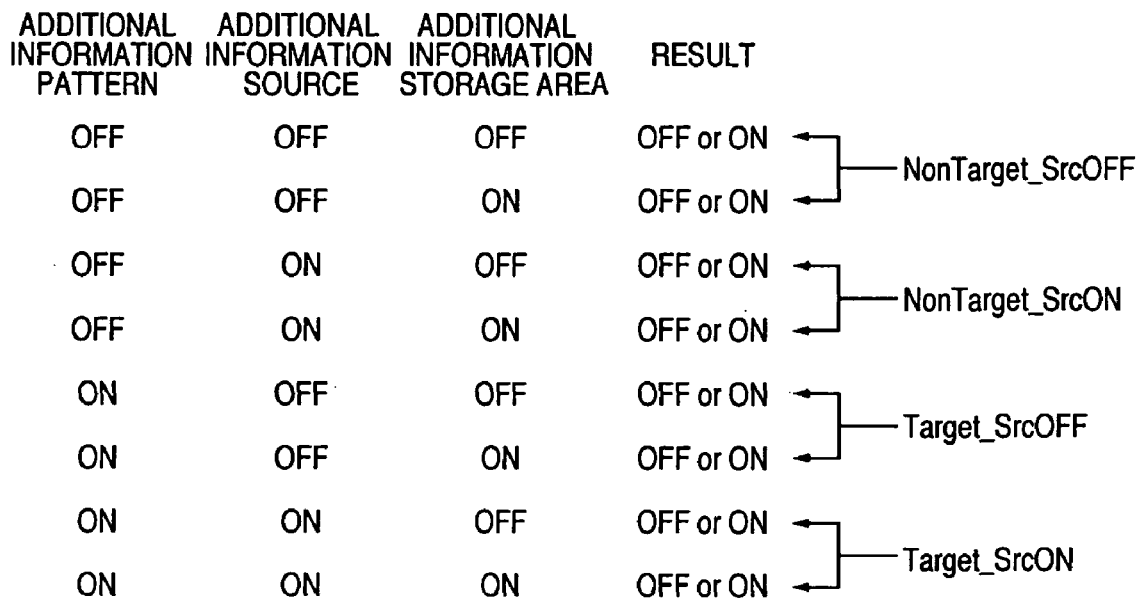
FIG. 8B is a view showing additional information operations of the embodiment which are expressed by a general logic operation format.
Figure 8C:
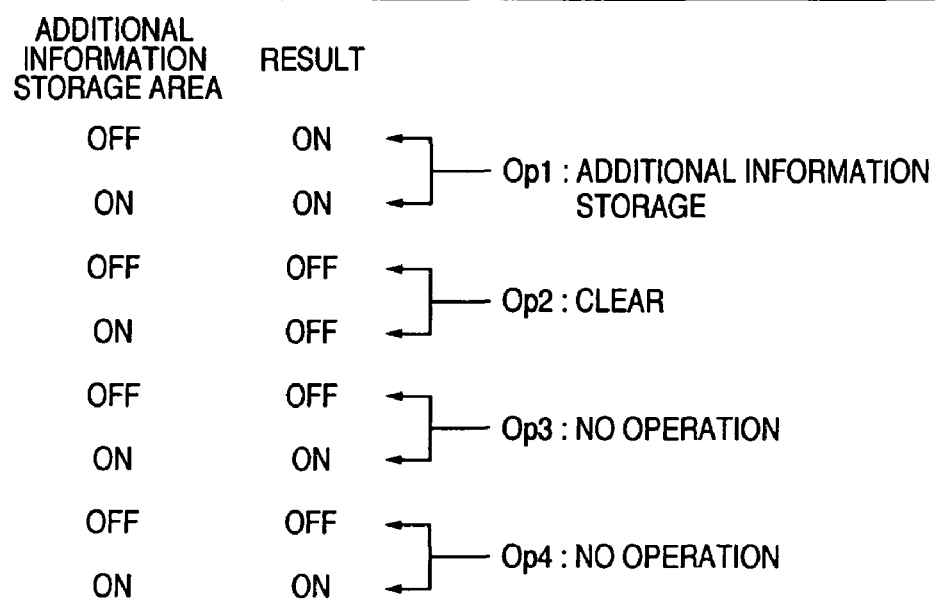
FIG. 8C is a view showing a storage example of additional information for all operations.

Referring to FIG. 8B, that the additional information pattern is OFF indicates an operation for a non-target attribute bit, i.e., NonTarget_SrcOFF or NonTarget_SrcON shown in FIG. 7D. In this case, Op1 (additional information storage) is not present as an operation. In Op2 (clear), since the bit is cleared, the operation result is always OFF independently of the value of destination (additional information storage area).

In Op3 (no operation), since the destination bit is directly used, the operation result is OFF or ON. Similarly, in Op4 (inversion), since the destination bit is directly used, the operation result is OFF or ON.

On the other hand, that the additional information pattern is ON indicates an operation for a target attribute bit, i.e., Target_SrcOFF or Target_SrcON shown in FIG. 7B. In this case, Op1 (additional information storage) can exist in addition to Op2, Op3, and Op4 when the additional information pattern is OFF. In Op1, since the additional information pattern is ON, the operation result is always ON independently of the value of destination (additional information storage area).

Referring to FIG. 8B, when a value uniquely determined by "result" determined by the above-described method is used as an additional information logic operation code, the same processing as the general logic operation can be executed even for the additional information in this embodiment. For example, the logic operation is executed by replacing OFF and ON shown in FIG. 8B with 0 and 1. Hence, an efficient logic operation can be executed for additional information without awareness of the target attribute bit.

Figure 9:
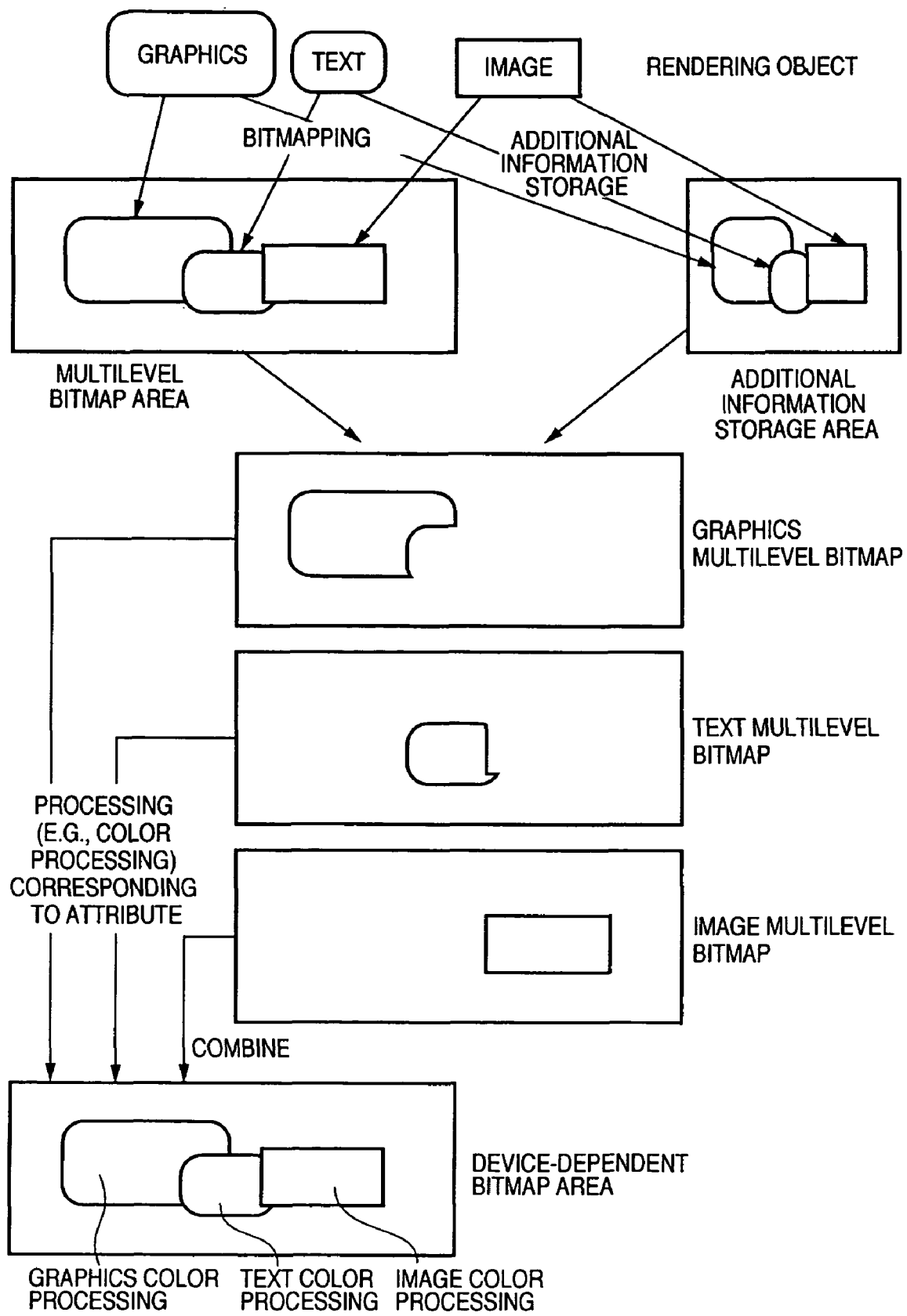
FIG. 9 is a view showing an example of color processing considering additional information of the embodiment.

FIG. 9 is a view showing an example of color processing that is executed for a bitmapped multilevel bitmap by using additional information created by executing a logic operation in the above-described way. In this embodiment, in bitmapping a rendering object, created additional information is stored in the additional information storage area, as shown in FIG. 9. In color processing, a multilevel bitmap corresponding to each additional information is extracted, and color processing is executed for each extracted area, thereby executing color processing corresponding to the attribute. The multilevel bitmaps of the respective attributes are combined again to create a bitmap depending on the device. The same result as described above can also be obtained even by executing color processing while observing additional information of each pixel instead of extracting a multilevel bitmap corresponding to each additional information.

Figure 11A:
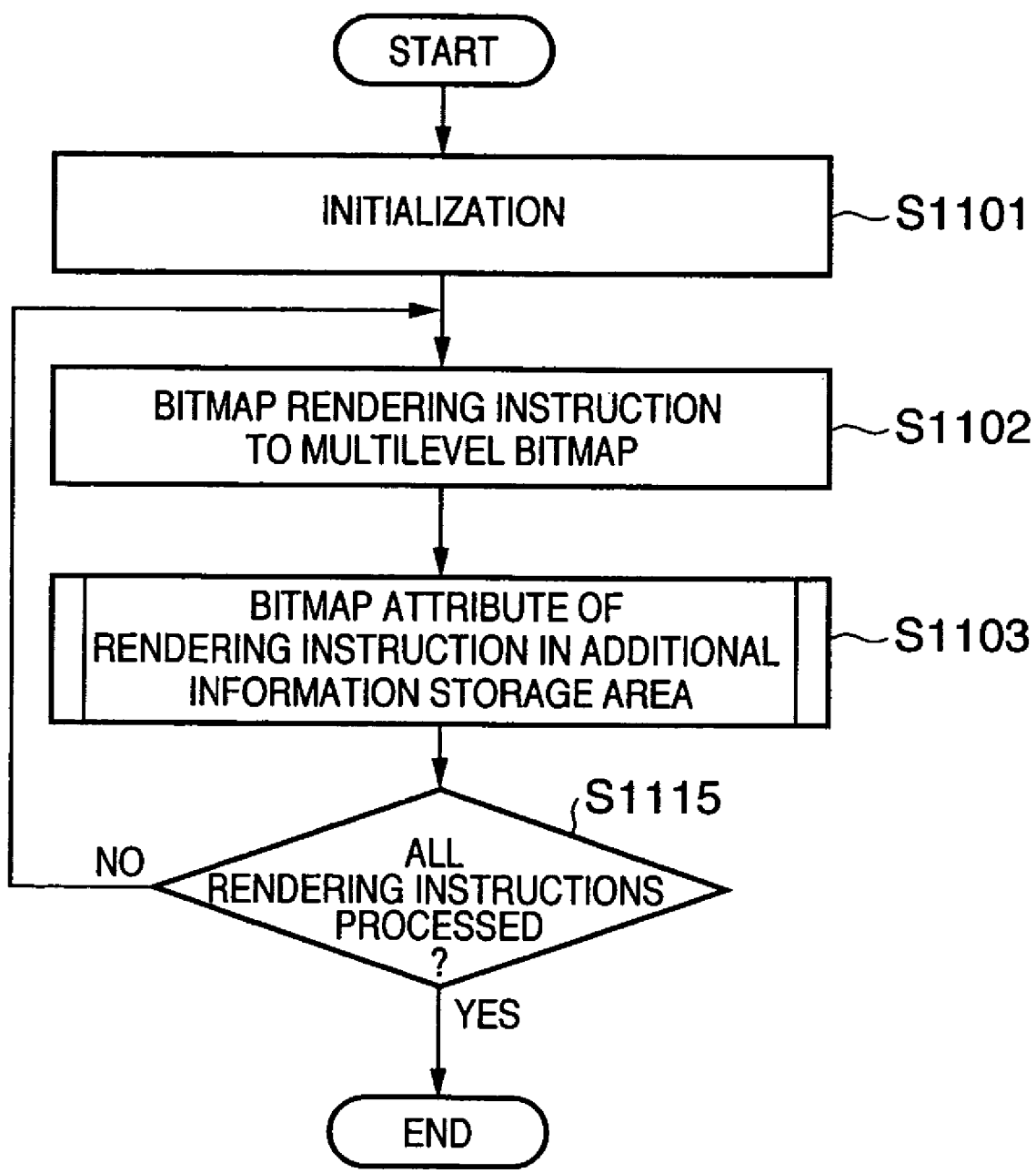
FIG. 11A is a flowchart showing image processing according to the embodiment.
Figure 11B:
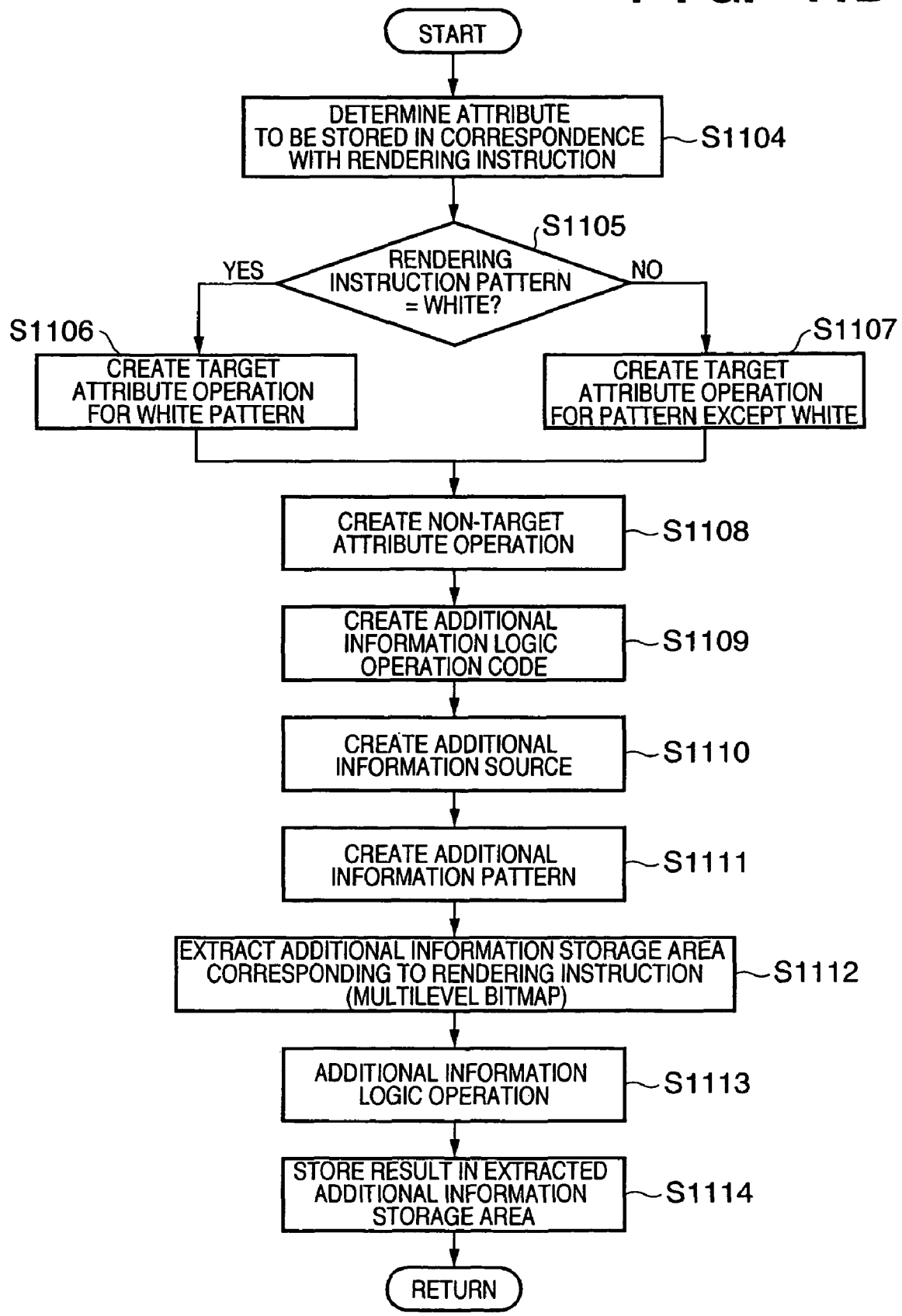
FIG. 11B is a flowchart showing additional information storage processing.
Figure 12:
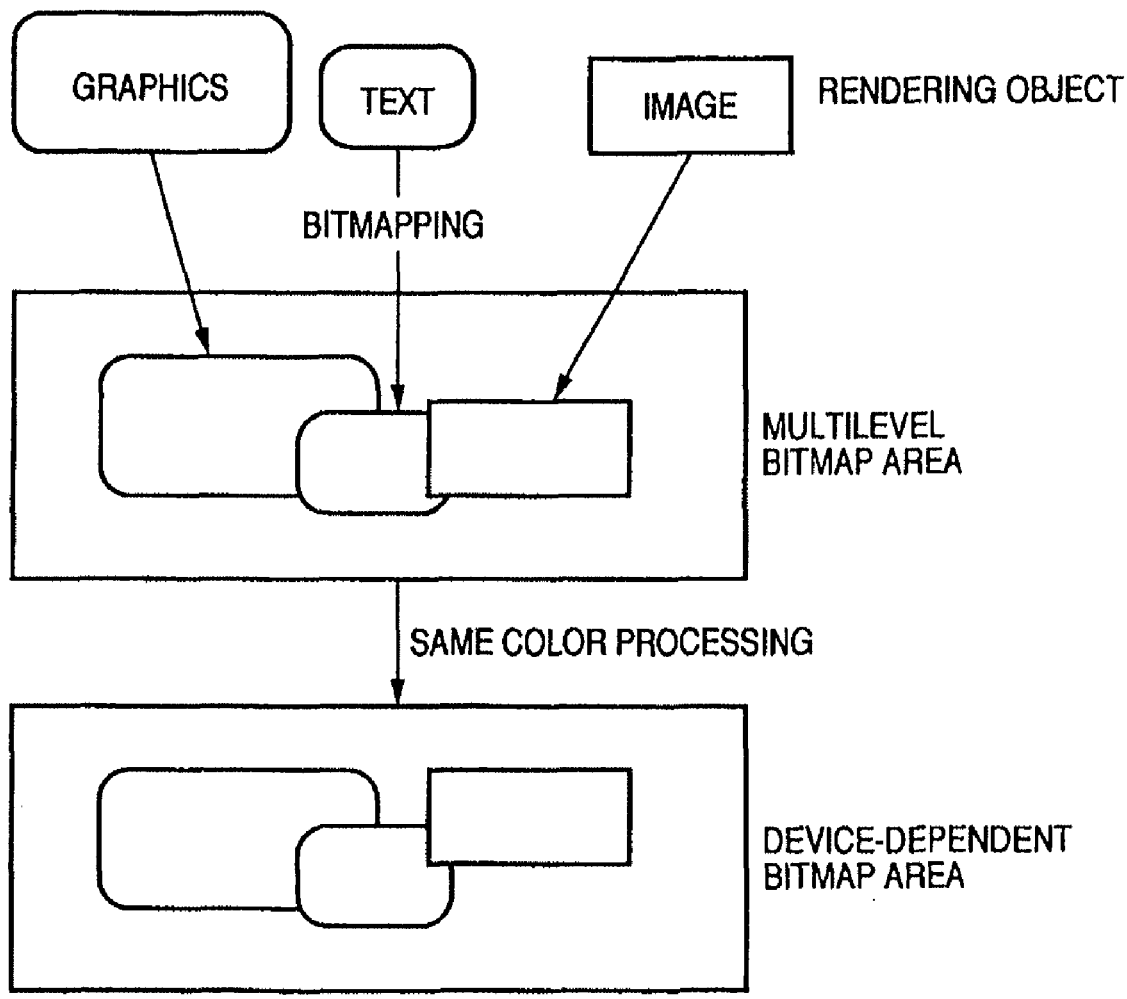
FIG. 12 is a view showing an example in which an rendering command is bitmapped in a multilevel bitmap area, and the same color processing is executed for all pixels.
Figure 13:
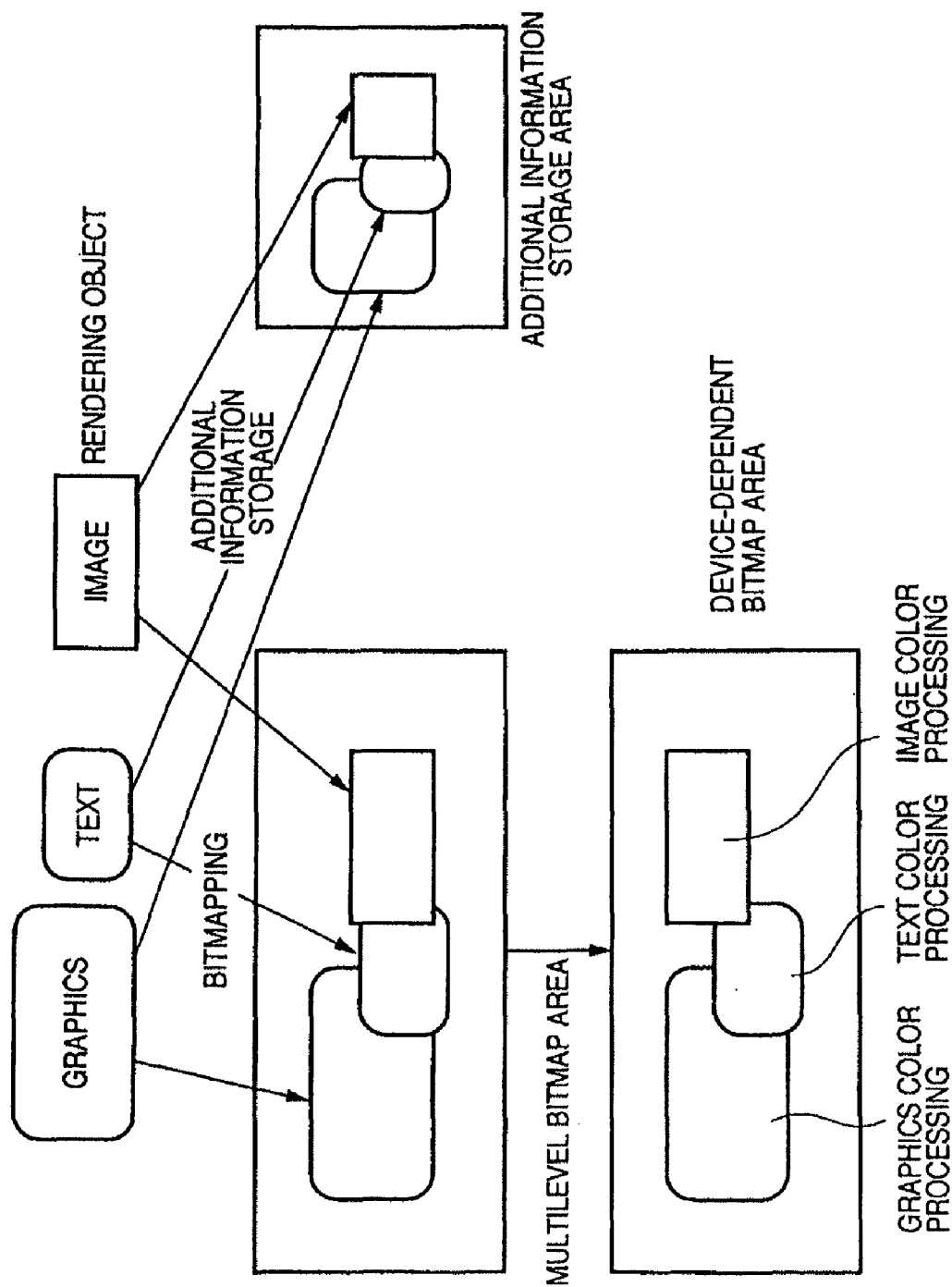
FIG. 13 is a view showing an example in which color processing for each attribute is implemented by setting additional information for all pixels.
Figure 14:
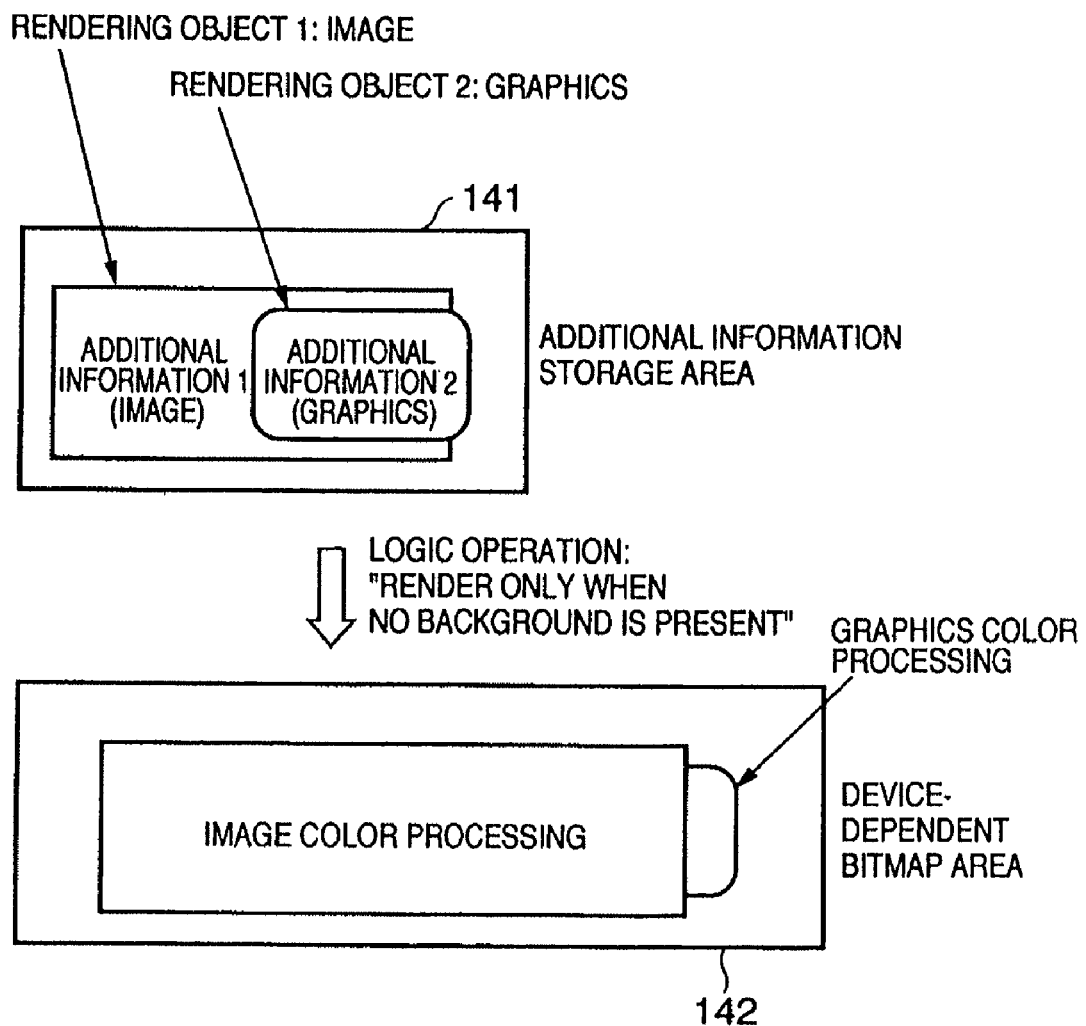
FIG. 14 is a view showing an example in which when a logic operation is designated for a rendering object, no additional information is stored.

The image processing method of this embodiment is programmed on the basis of the flowcharts shown in FIGS. 11A and 11B. Image print processing according to the present invention will be described below with reference to the flowcharts.

When an instruction is input from the input device 4 shown in FIG. 1 to execute printing, of the OS, driver, and application shown in FIG. 2, the OS receives the message. The OS sends the print execution instruction to an application currently in an active state.

The application converts the message into a command recognizable by the OS and sends data to be printed and a command message to the OS. The OS converts the message into a command recognizable by the driver and sends the command to the driver. The processing indicated by the flowchart in FIG. 11A is executed by the driver.

At the reception timing of the initialization message, the driver allocates an area to store multilevel bitmaps and an additional information storage area in the main storage device 2 and clears the contents (S1101). The driver bitmaps a multilevel bitmap in accordance with a rendering command sent from the OS (S1102) and bitmaps the attribute of the rendering command in the additional information storage area (S1103). When all rendering commands are bitmapped to multilevel bitmaps, and these attributes are stored in corresponding additional information storage areas (S1115), accurate additional information can be acquired together with rendering data.

Additional information storage processing in step S1103 will be described below in detail with reference to the flowchart shown in FIG. 11B.

To bitmap the attribute of additional information, the attribute (a target attribute such as the image, graphics, or text attribute) of the rendering command is determined (S1104). It is checked whether the pattern in the rendering command is white (S1105). In accordance with the result, an appropriate part of a logic operation code designated by the rendering command is extracted, and an additional attribute operation is created, as shown in FIG. 7B (S1106 and S1107). The operation created here is an operation in bitmapping the attribute (target attribute) of the rendering command in the additional information storage area.

In this embodiment, if no logic operation is designated by the rendering command, a logic operation code is created as overwrite processing.

An operation for each attribute (non-target attribute) except the attribute of the rendering command is created, as shown in FIG. 7D, on the basis of the operation of the target attribute (S1108).

The processing can also be executed by selectively performing operations for all attributes of additional information by using the precedingly created operations. However, for efficient processing, this embodiment provides a method of executing batch processing independently of the target attribute bitmapped as additional information, as described with reference to FIGS. 8A to 8D. For this reason, as shown in FIGS. 8B and 8C, an additional information logic operation code is created on the basis of the operation created in steps S1106 to S1108 (S1109).

Next, an additional information source is created, as shown in FIG. 7C (S1110).

Additionally, in the additional information format shown in FIG. 4, an additional information pattern is created by setting the bit representing the attribute (target attribute) of the rendering command to ON and remaining bits (non-target attributes) to OFF, as shown in FIG. 8 (S1111). In bitmapping a rendering command to a multilevel bitmap, an additional information storage area corresponding to a pixel of each multilevel bitmap is extracted as an additional information storage area destination (S1112).

A logic operation based on the additional information source, additional information pattern, and additional information destination is executed by using the additional information logic operation code (S1113). The operation result is stored in the additional information destination (S1114). With the above processing, the additional information storage processing in step S1103 is ended.

When bitmapping and additional information storage of all rendering commands are ended, as described above, color processing optimum for each attribute is executed in accordance with the additional information, thereby creating optimum device-dependent bitmap.

This embodiment can be applied to an image processing apparatus of any form if it executes rendering.

Three kinds of attributes, i.e., image, text, and graphics have been mainly exemplified above as the attribute of a rendering command. However, the present invention is not limited to this example. The number of identifiable attributes and their contents can arbitrarily be set by adding an attribute bit of additional information.

In this embodiment, a rendering command is bitmapped to a multilevel bitmap. The image data format of the present invention only needs to be able to express color information of each pixel. For example, the present invention can also be implemented by, e.g., bitmapping to binary image data.

This embodiment is executed as the function of a printer driver in a host computer comprising the central processing unit 1 and main storage device 2 as described above. However, the present invention is not limited to this form. For example, a host computer may receive a rendering command from an application or OS, change the rendering command to a rendering command in PDL (Page Description Language) or intermediate language, and transmit it to the printer 7. In this case, this processing is implemented as internal processing of the printer 7.

According to the above-described embodiment, in rendering wherein a rendering command received from an application or OS is bitmapped to a multilevel bitmap, and additional information representing the attribute of each pixel of the multilevel bitmap is created, appropriate additional information can be created even for a rendering command with a device-dependent bitmap designation. Hence, a high-quality image can be obtained by executing color processing corresponding to the attribute of each pixel.

<Modification>

In the above-described first embodiment, when a default attribute is set in advance, the number of bits necessary as the additional information storage area can be reduced.

Figure 10:
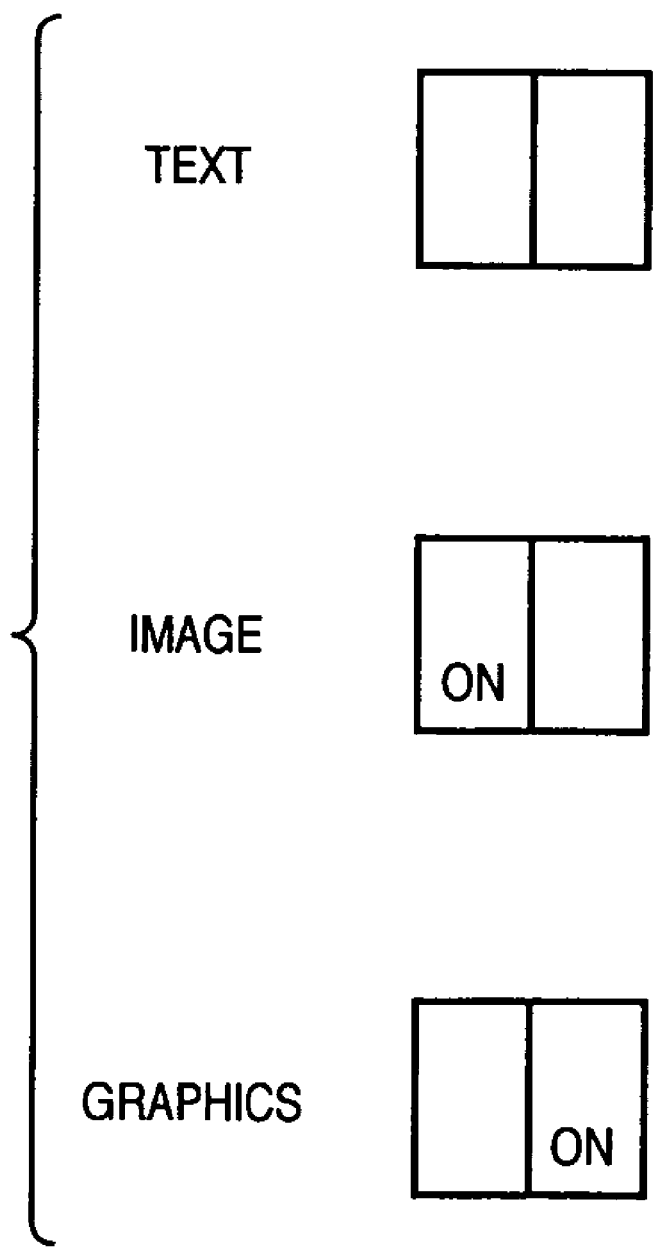
FIG. 10 is a view showing a modification to the embodiment in which an additional information storage area is reduced.

FIG. 10 shows an example. According to FIG. 10, the number of bits necessary for the additional information storage area to indicate three kinds of attributes, i.e., "text", "image", and "graphics" as additional information, as in the above-described embodiment, can be reduced by one. In the example shown in FIG. 10, the default value indicates the text attribute. That is, two bits representing "image" and "graphics" are prepared as the additional information storage area per pixel. If both bits are OFF, the text attribute is defined.

Even in this case, image processing for each attribute as described with reference to FIGS. 4 to 9 can be executed, as in the first embodiment.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-140005 filed on May 12, 2005, which is hereby incorporated by reference herein in its entirety.

What is claimed is:

1. An image processing method for creating bit-map data and attribute data for each pixel corresponding to the bit-map data by executing a rendering command, wherein the attribute data of each pixel includes a plurality of attribute bits representing image, graphics, and a text attribute as a type of rendering object for the corresponding pixel, respectively, the method comprising:

determining a type of operation to be performed when storing an operation result for a source image bit into a destination image bit as an attribute data storing area based on a logic operation processing designated by the rendering command;

creating a logic operation processing for the attribute data based on the determined type of operation; and creating attribute data by executing the created logic operation processing, wherein in a case of the determined type of operation indicates an operation for inverting the destination image bit regardless of the value of the source image bit, no operation is performed to a target attribute bit in the attribute data of an image resulting from the operation, wherein the target attribute bit is a bit of an attribute of the rendering command.

2. An image processing apparatus for creating bit-map data and attribute data for each pixel corresponding to the bit-map data by executing a rendering command, wherein the attribute data of each pixel includes a plurality of attribute bits representing image, graphics, and a text attribute as a type of rendering object for the corresponding pixel, respectively, the image processing apparatus comprising:

a determination unit for determining a type of operation to be performed when storing an operation result for a source image bit into a destination image bit as an attribute data storing area based on a logic operation processing designated by the rendering command;

a creating unit for creating a logic operation processing for the attribute data based on the determined type of operation, and for creating attribute data by executing the created logic operation processing, wherein in a case of the determined type of operation indicates an operation for inverting the destination image bit regardless of the value of the source image bit, no operation is performed to a target attribute bit in the attribute data of an image resulting from the operation, wherein the target attribute bit is a bit of an attribute of the rendering command.

* * * * *